UNITED STATES PATENT OFFICE.

THOMAS B. ALDRICH, OF DETROIT, MICHIGAN, ASSIGNOR TO PARKE, DAVIS & COMPANY, OF DETROIT, MICHIGAN, A CORPORATION OF MICHIGAN.

GLANDULAR EXTRACTIVE PRODUCT AND PROCESS OF MANUFACTURING SAME.

1,271,111.      Specification of Letters Patent.      Patented July 2, 1918.

No Drawing.      Application filed March 3, 1913. Serial No. 751,962.

*To all whom it may concern:*

Be it known that I, THOMAS B. ALDRICH, a citizen of the United States, residing at Detroit, in the county of Wayne and State of Michigan, have invented certain new and useful Improvements in Glandular Extractive Products and Processes of Manufacturing Same, of which the following is a specification.

My invention relates to a new and useful product and the process of making the same, as pointed out in the claims concluding these specifications.

A water extract of the therapeutically active substance contained in the infundibular or posterior lobe of the pituitary gland, is at the present time made and sold by different manufacturers under different trade-names, such as pituitrin; pituglandol; pituitary extract, vaporole, etc. This extract, when administered hypodermically, has the effect of increasing the blood pressure and of stimulating uterine contractions. As a uterine stimulant its effect is especially pronounced just at the time of natural childbirth, and it is at present largely used for that purpose. In this respect it differs from ergot. The blood pressure effect is similar to that produced by adrenalin (the blood-pressure-raising, hemostatic and astringent principle of suprarenal glands) but is much more prolonged.

The above extract has been found to be very unstable—that is, it decomposes on standing and becomes less and less effective. It is, therefore, desirable to isolate the active substance in a solid, friable or powdered state and in a soluble condition in which it can be preserved indefinitely and is immediately available for use by dissolving it when needed. This I have succeeded in doing in a satisfactory manner.

In order to obtain the active principle in the form of powder I make a glycerin extract of the infundibular lobe of the pituitary gland and precipitate the active principle from the same by a suitable precipitant, such as alcohol (either ethyl or methyl), acetone or a mixture thereof. As an example of my process the following may be given:

The pituitary gland is obtained in as fresh condition as possible and the infundibular portion removed therefrom. This portion is then reduced to a pulp and dried at body temperature, if desired. It may then, if desired, be dehydrated and defatted with acetone or some other suitable solvent. The dried material may then be finely powdered and about ten parts of glycerin, say, 50% glycerin (that is, one part gylcerin to one part water) added. The extract may be obtained by macerating, shaking or grinding, with or without heat to, say, 50° C. After the glycerin extract has been in contact with the gland material for a number of days, it is subjected to filtration—the filtration going on fairly rapidly when 50% glycerin is employed. The extraction may be repeated as often as required. When a clear solution is obtained, one may add to one part of glycerin extract, say, three parts of 95% to 98% alcohol, agitate, and then add, say, four parts of acetone. After the precipitate has subsided the supernatant liquid may be decanted and the precipitate washed with successive small portions of acetone. Place in a vacuum-desiccator to remove traces of acetone and eventually reduce to a powder if not already in that form. The resultant is a fluffy, white or nearly white powder. That the product is a highly potent one therapeutically and is at least a close approximation to, if not the chemically pure active principle of the pituitary gland, may be judged from the fact that a fraction of a milligram of the substance is an efficient dose on the occasion of human childbirth.

A solution of the product is precipitated by most, if not all, of the so-called alkaloidal precipitants, such as phospho-tungstic acid, picric acid, mercuric chlorid, mercuric potassium iodid, platinic chlorid, etc. It gives what is known as Pauly's reaction, similar to histidin. It gives with Millon's reagent the characteristic reaction for proteid in which tyrosin is present. It gives the biuret reaction. It is soluble in water, preferably acidulated, and glycerin of all strengths; but is insoluble in strong alcohol, acetone, etc.

What I claim and desire to secure by Letters Patent of the United States is:—

1. A substance possessing pressor and oxytocic activity extracted from the infundibular lobe of the pituitary gland such as can be obtained by the herein described process which comprises making a glycerin extract of said lobe and precipitating the substance from said extract with alcohol or acetone.

2. The process of extracting a substance possessing pressor and oxytocic activity from the infundibular lobe of the pituitary gland which consists in making a glycerin extract of said lobe and precipitating the said material therefrom by a suitable precipitant.

3. The process of extracting a substance possessing pressor and oxytocic activity from the infundibular lobe of the pituitary gland which consists in dehydrating said lobe making a glycerin extract thereof and precipitating the said material by a suitable precipitant.

4. The process of extracting a substance possessing pressor and oxytocic activity from the infundibular lobe of the pituitary gland which consists in dehydrating and defatting said lobe making a glycerin extract thereof and precipitating the said material therefrom by a suitable precipitant.

In testimony whereof I have hereunto signed my name in the presence of the subscribing witnesses.

THOMAS B. ALDRICH.

Witnesses:
J. EDGAR BULL,
M. E. McNINCH.